April 28, 1936. I. NAGAMATSU 2,038,851

HOOK

Filed April 19, 1935

Inventor

Ikugoro Nagamatsu

By Clarence A. O'Brien and
Hyman Berman
Attorney

Patented Apr. 28, 1936

2,038,851

UNITED STATES PATENT OFFICE 2,038,851

HOOK

Ikugoro Nagamatsu, Las Vegas, Nev.

Application April 19, 1935, Serial No. 17,206

1 Claim. (Cl. 24—117)

This invention relates to improvements in fasteners and more particularly to a fastener for securing strands, rope and other elongated elements in anchored position.

The principal object of the present invention is to provide a fastener in the nature of an anchor which can be employed on shoes as a shoe string fastener or in various other capacities.

Another important object of the invention is to provide a fastener of the character stated which is of simple construction and not susceptible to the ready development of defects.

Figure 1:
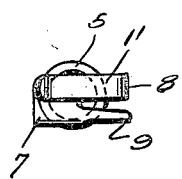
Figure 1 represents a top plan view of the fastener.
Figure 2:
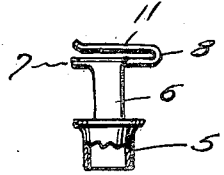
Figure 2 represents a side elevational view of the fastener with the rivet portion in section.
Figure 3:
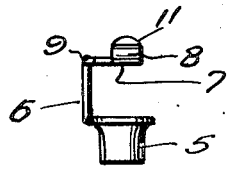
Figure 3 is an end elevational view of the fastener.

Referring to the drawing wherein like numerals designate like parts, it can be seen that numeral 5 represents a rivet such as will be required in using the fastener on shoes as a shoe string anchor.

Figure 4:
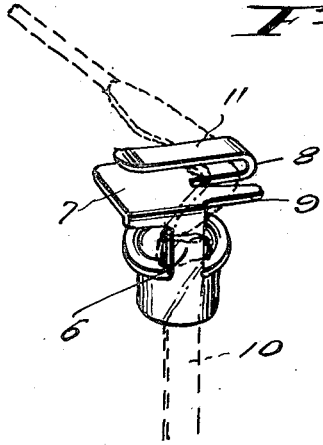
Figure 4 represents a perspective view of the fastener.

From the rivet 5 extends the shank 6 and from the upper portion of the shank 6 extends the laterally disposed plate 7 which is of substantially rectangular shape. This plate 7 is bifurcated at one end to provide an elongated leg 8 and a relatively short leg 9. The notch defining this bifurcated end portion and the two legs 8—9 is preferably V-shaped so that the shoe string or other element 10 can be wedged therein when it has been properly disposed around the shank 6 and otherwise disposed as shown in Figure 4. The elongated leg 8 is bent backwardly over the plate proper 7 to form the guide 11 under which the tip portion of the string is disposed. (See Figure 4.)

While the foregoing specification sets forth the invention in specific terms, it is to be understood that numerous changes in the shape, size and materials may be resorted to without departing from the spirit or scope of the invention as claimed hereinafter.

Having described the invention, what is claimed as new is:

A shoestring hook comprising a shoe attaching rivet, a shank extending from the rivet in an outward direction with respect to a shoe to which it is attached, said shank being provided with a laterally extending plate substantially parallel to the side of the shoe to which it is related, said plate being bifurcated at one end to provide a wedge shaped cut out portion, one leg of the said bifurcations extending on a plane with the said plate, and the other leg of the bifurcation being substantially longer than the other and bent backwardly over the plate to provide a shoestring guide.

IKUGORO NAGAMATSU.